(12) United States Patent
Cattaneo

(10) Patent No.: US 8,875,737 B2
(45) Date of Patent: Nov. 4, 2014

(54) HIGH PERFORMANCE SINGLE CONTROL LEVER MIXING CARTRIDGE

(76) Inventor: Piero Cattaneo, Cavaglio d'Agogna (IT)

( * ) Notice: Subject to any disclaimer, the term of this patent is extended or adjusted under 35 U.S.C. 154(b) by 387 days.

(21) Appl. No.: 13/400,743

(22) Filed: Feb. 21, 2012

(65) Prior Publication Data

US 2012/0211106 A1    Aug. 23, 2012

(30) Foreign Application Priority Data

Feb. 22, 2011    (IT) .............................. MI2011A0263

(51) Int. Cl.
*F16K 11/06* (2006.01)
*F16K 11/078* (2006.01)

(52) U.S. Cl.
CPC .................................. *F16K 11/0787* (2013.01)
USPC ....................................................... 137/625.4

(58) Field of Classification Search
USPC ............................. 137/625.17, 625.4, 625.41
See application file for complete search history.

(56) References Cited

U.S. PATENT DOCUMENTS

| | | | |
|---|---|---|---|
| 7,021,335 B2* | 4/2006 | Yang ........................ | 137/625.41 |
| 7,753,074 B2* | 7/2010 | Rosko et al. ................ | 137/625.4 |
| 8,578,966 B2* | 11/2013 | Thomas et al. .......... | 137/625.17 |
| 8,656,954 B2* | 2/2014 | Deutsch et al. ............ | 137/625.4 |

* cited by examiner

*Primary Examiner* — John Fox
(74) *Attorney, Agent, or Firm* — Hedman & Costigan, P.C.; James V. Costigan; Kathleen A. Costigan

(57) ABSTRACT

A high performance single control lever mixing cartridge, characterized in that said mixing cartridge comprises a holding body housing at least a bottom fixed plate and at least a top movable plate, with an indirect driving system including a driving member, said holding body including side windows allowing the top movable plate and driving member to exit said holding body, during its stroke on the end limits from the full hot water to the full cold water position.

11 Claims, 6 Drawing Sheets

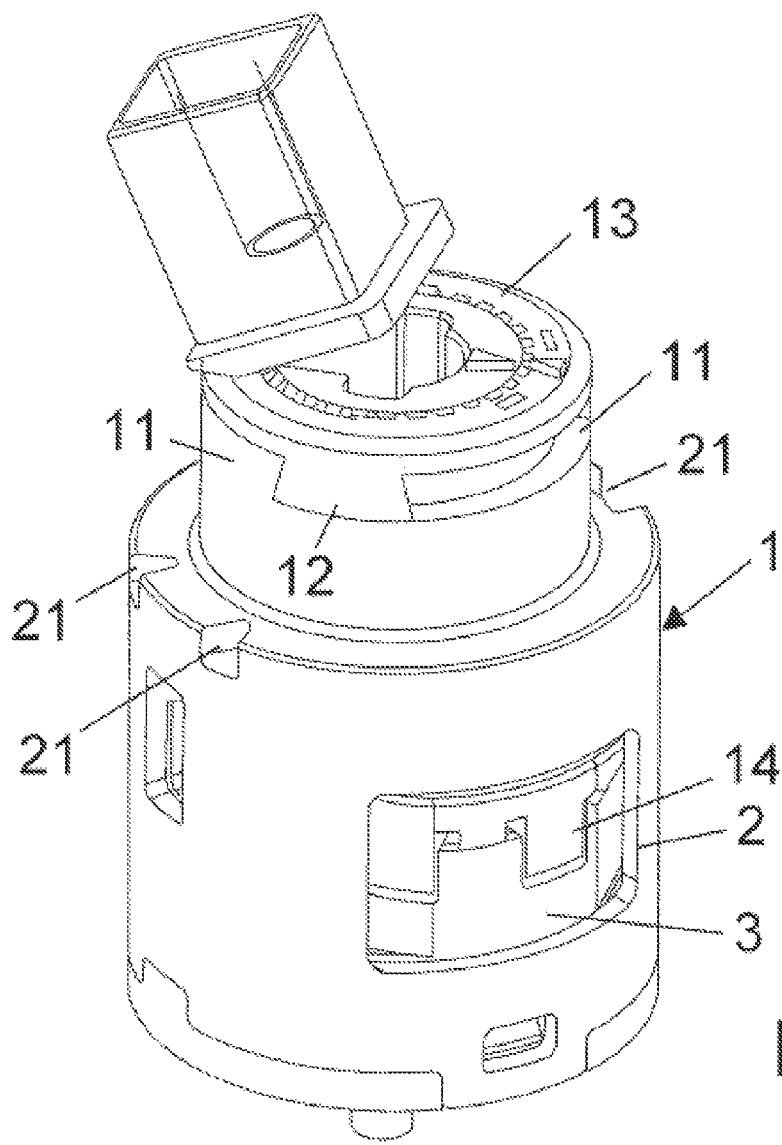
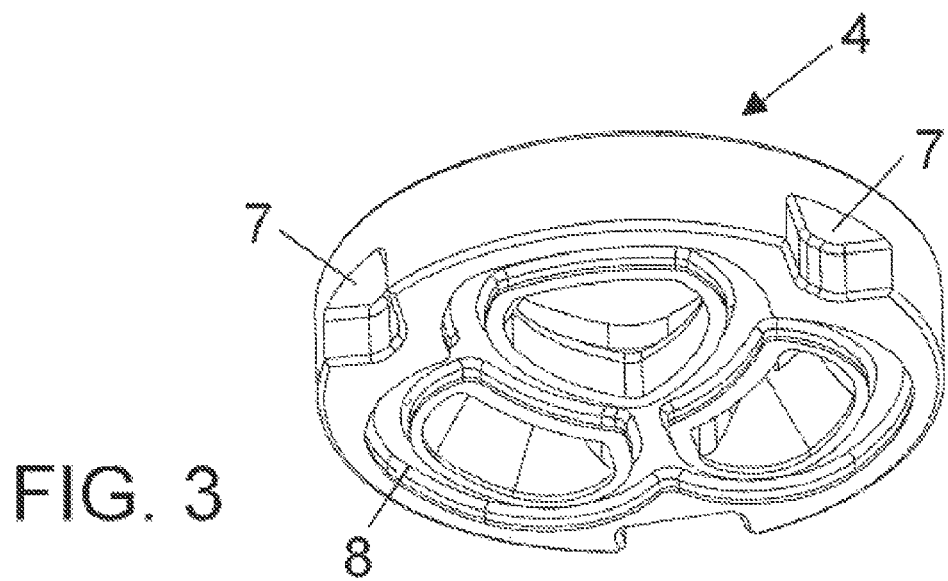

HIGH PERFORMANCE SINGLE CONTROL LEVER MIXING CARTRIDGE

BACKGROUND OF THE INVENTION

The present invention relates to a high performance single control lever mixing cartridge.

As it is known, in the faucet field, mixing cartridges of a ceramic disc type for single lever controlled faucet assemblies are broadly diffused.

The above mixing cartridges have been progressively greatly improved both with respect to their reliable operation and their hydraulic and acoustic performance.

Another aspect of the technological development of the above articles is related to the reduction of their height and diameter size, from a starting conventional diameter of 47-50 mm, to a 40 mm diameter size, at present.

The same Applicant of this application has made, in 1988, a cartridge having a diameter of 35 mm and a performance equal to or greater than those of previous commercially available 40 mm diameter high performance cartridges.

In recent times, further improved mixing cartridges, of a 25 mm diameter, have been developed, which were at the start designed for some types of faucets for the USA market, for which the flow rate and noise characteristics were not of main importance.

In Europe, the above small cartridges have been also used on specifically designed hydraulic products, but with several limitations due to the low delivery flow rates and other problems related to their continuous reliable operation.

From the above mentioned 25 mm diameter small cartridges, further 28 and 30 mm diameter cartridges have been derived, allowing water to circulate both thereabout and therewithin, to provide a water outlet not only on the bottom of the faucet but also laterally for the overall height of the cartridge body.

However, these latter mixing cartridges, which are conceptually similar to the 25 mm diameter cartridges therefrom they have been derived, were affected by a comparatively low water delivery and flow rate controlling performance.

SUMMARY OF THE INVENTION

Accordingly, the aim of the present invention is to provide such a small size high performance single control lever mixing cartridge overcoming all the above mentioned problems of such prior art cartridges.

Within the scope of the above mentioned aim, a main object of the invention is to provide such a high performance single control lever mixing cartridge which provides a water flow rate larger than that provided by a prior like-size mixing cartridge.

Another object of the present invention is to provide such a high performance single control lever mixing cartridge which may be easily made starting from easily available elements and materials and which, moreover, is very competitive from a mere economic standpoint.

Yet another object of the present invention is to provide such a high performance single control lever mixing cartridge which is very reliable and safe in operation.

According to one aspect of the present invention, the above mentioned aim and objects, as well as yet other objects, which will become more apparent hereinafter, are achieved by a high performance single control lever mixing cartridge, characterized in that said mixing cartridge comprises a holding body housing at least a bottom fixed plate and at least a top movable plate, with an indirect driving system including a driving member.

Said holding body comprises side windows allowing the top movable plate and driving member to exit said holding body during its stroke on the end limits from the full hot water to the full cold water position.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where:

FIG. 2 is a further perspective view of the holding body of the inventive mixing cartridge;

FIG. 3 is yet another perspective view of a bottom fixed plate included in the mixing cartridge according to the present invention;

DESCRIPTION OF THE PREFERRED EMBODIMENTS

Figure 1:
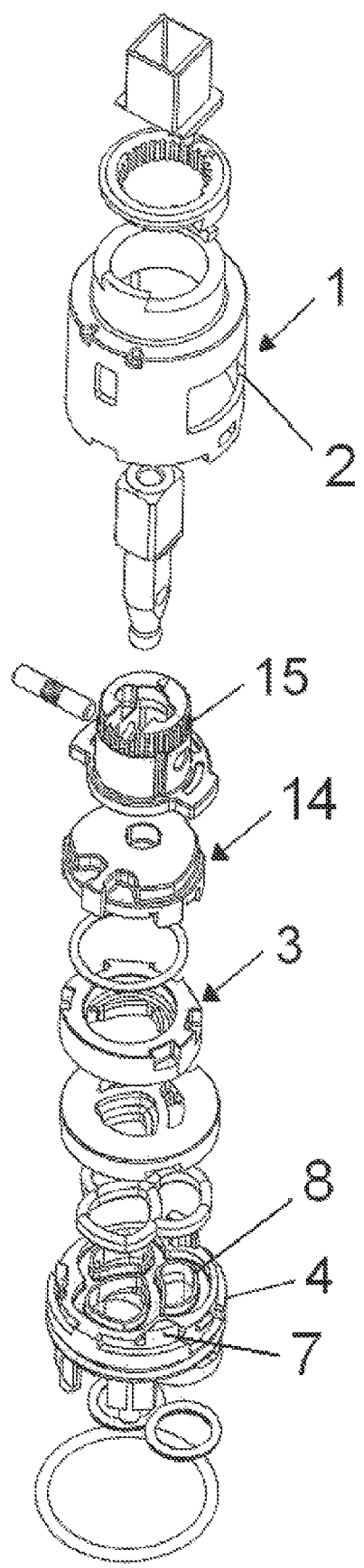
FIG. 1 is an exploded perspective view of the high performance single control lever mixing cartridge according to the present invention.

With reference to the number references of the above mentioned figures, the high performance single control lever mixing cartridge according to the present invention, is preferably of the so-called "closure position idle type", that is of a type in which the top plate is driven by an indirect driving system, to provide improved operating performance.

In order to maximize the useful movement area or field of the top plate, through the holding body 1 of the mixing cartridge have been formed side windows 2, allowing the top movable plate 3 and the driving member 14 of said top movable plate to exit said holding body 1, as said driving member is driven 9 by a control lever not shown) from an all hot water to an all cold water.

Said side windows 2 are designed exclusively for allowing a larger displacement and size of the movable plate 3, differently from similar windows of some prior articles allowing only a lateral outflow of the mixed water.

Figure 4:
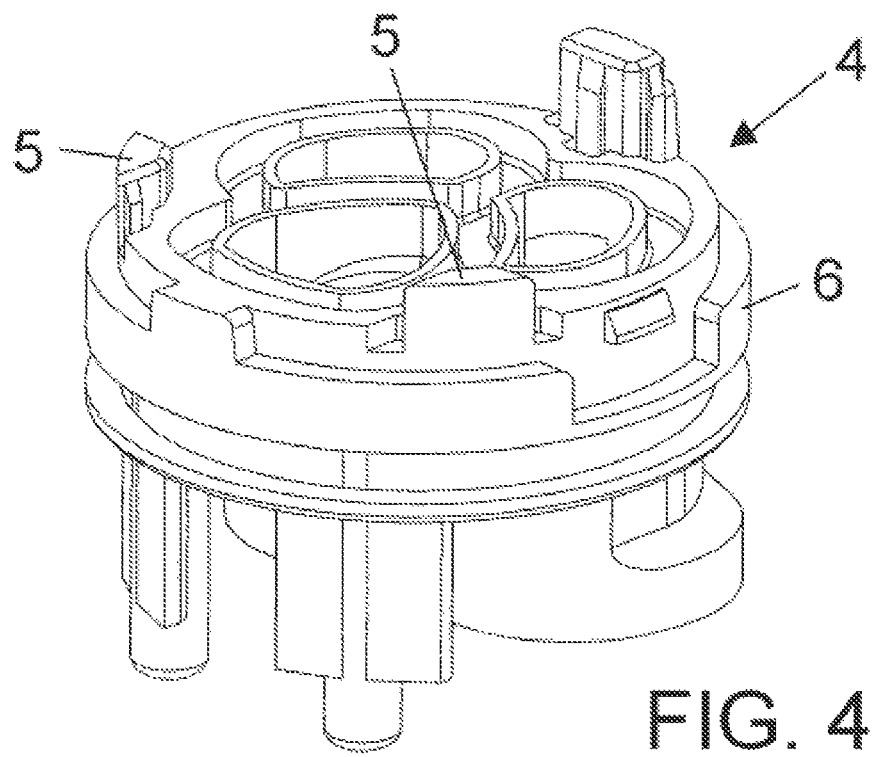
FIG. 4 is yet another perspective view showing a clamping of the bottom plate.

FIG. 3 shows the fixed bottom plate 4 which is clamped or coupled, through two rear blind not throughgoing rear recesses 7, to latching elements 5 on a plastics material 6, as shown in FIG. 4.

To achieve an improved high pressure sealing, the fixed bottom plate 4, shown in FIG. 3, comprises, on a bottom side thereof, a plurality of slots 8 for engaging therein, in a partially recessed position, an inner sealing gasket.

In this connection it should be pointed out that the above type of construction has never been used on a small size structure as that disclosed by the present invention.

Figure 5:
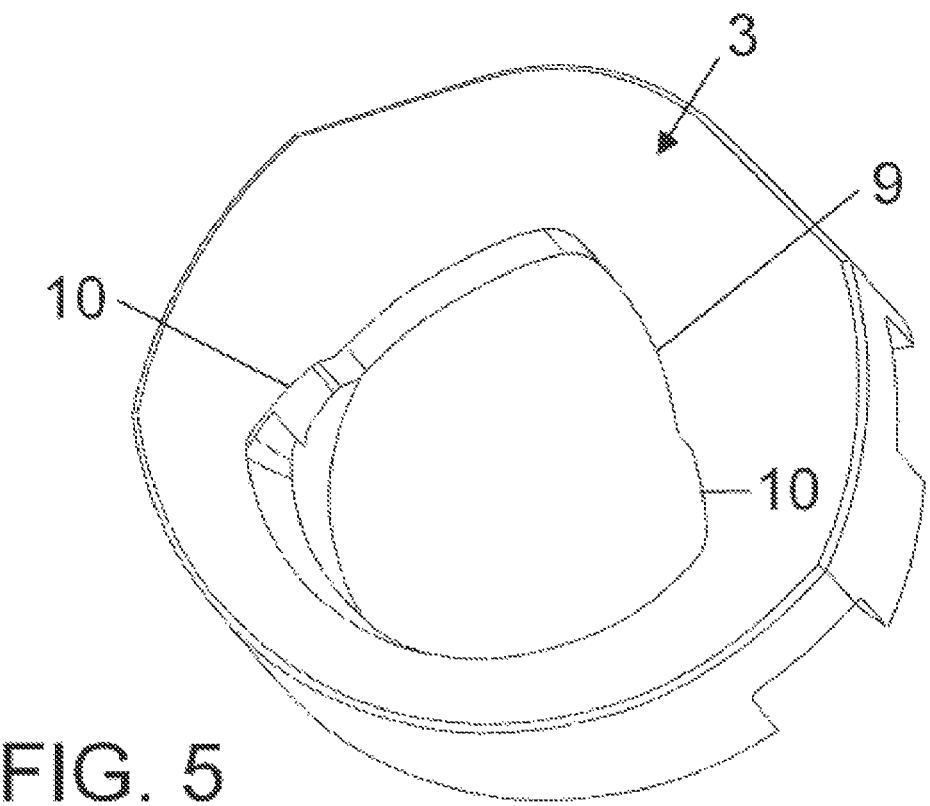
FIG. 5 is yet another perspective view showing a movable plate included in the inventive mixing cartridge.

As shown in FIG. 5, the movable plate 3 is so contoured as to maximize the hydraulic performance of the mixing cartridge.

More specifically, the top movable plate 3 comprises a specifically designed profile 9, of a substantially triangular contour, with convex sides and being characterized by the provision of two side outlet or supplementary lugs 10.

This configuration is present both in the embodiment in which the plate has an open cavity and in the embodiment in which said plate has a blind cavity or hollow.

As shown in FIG. 2, the holding body 1 comprises, at the top portion thereof, two detent elements 11, having substantially a reversed trapezoidal configuration, and a contour mating a contour of corresponding detent elements 12 provided on a temperature limiting ring nut member 13.

This construction prevents the ring nut member from accidentally disengaging as its two slanted or inclined planes abut against the respective detent portions of the holding body.

Figure 6:
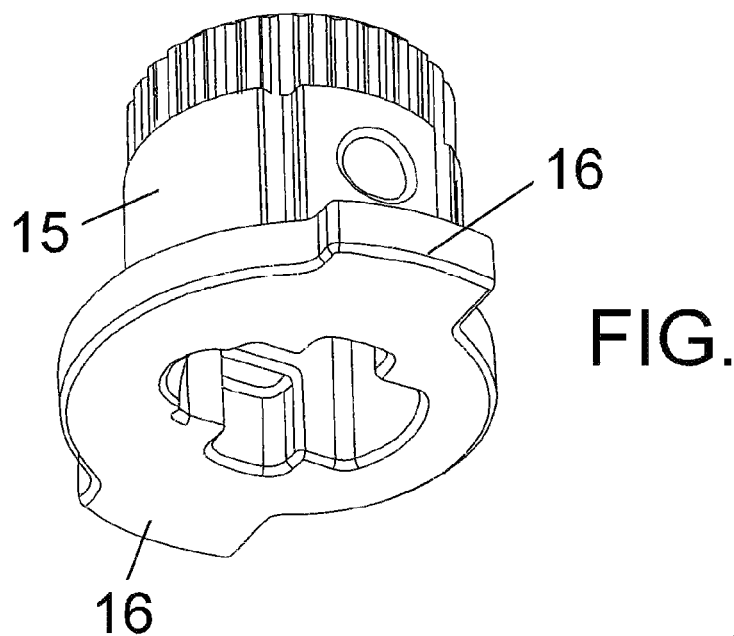
FIG. 6 is yet another perspective view showing a support for a rod element of the inventive mixing cartridge.

As shown, said cartridge further comprises a cartridge rod 15, shown in FIG. 6, supported by a support element including a double abutment of the lugs on rotary detent members provided inside said holding body 1, to increase the detent element efficiency.

Figure 7:
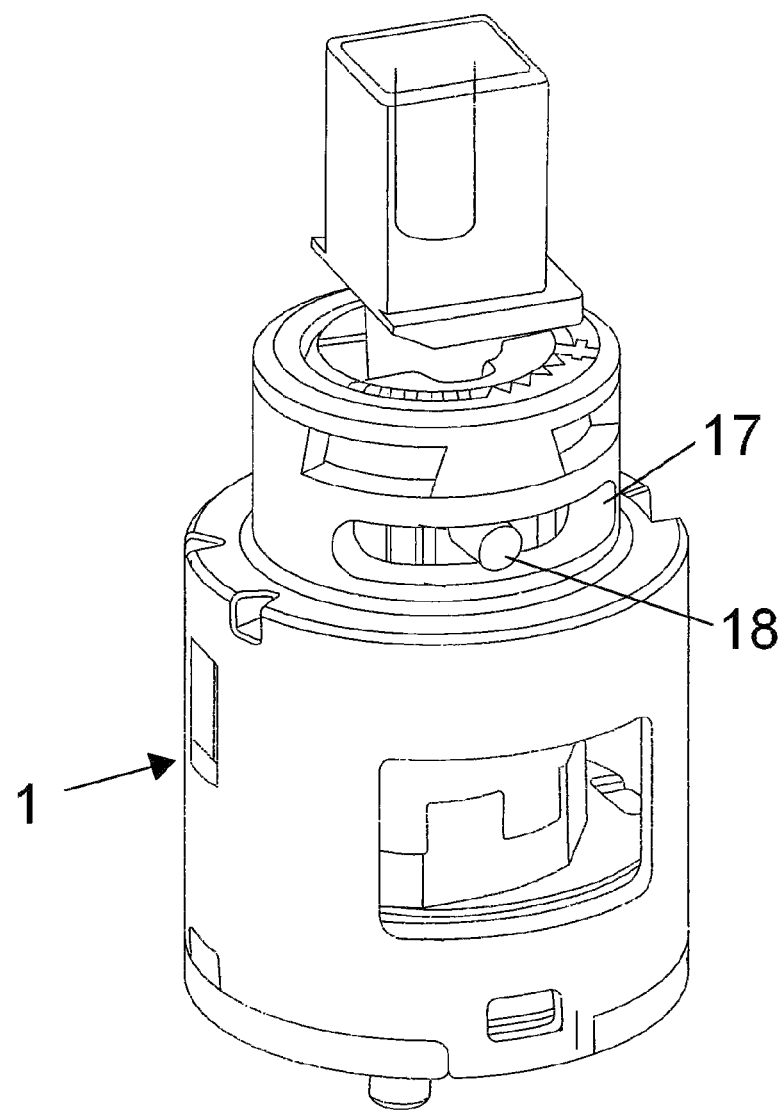
FIG. 7 is yet another perspective view showing the cartridge holding body and a rod rotary pin element.

If necessary, the strength of said detent members may be enhanced by a rod rotary pin 18, shown in FIG. 7, having such a length as to bear on end portions of dedicated elongated holes 17, formed in the collar of the holding body 1, as a fully leftward or rightward rotary movement is carried out.

Figure 8:
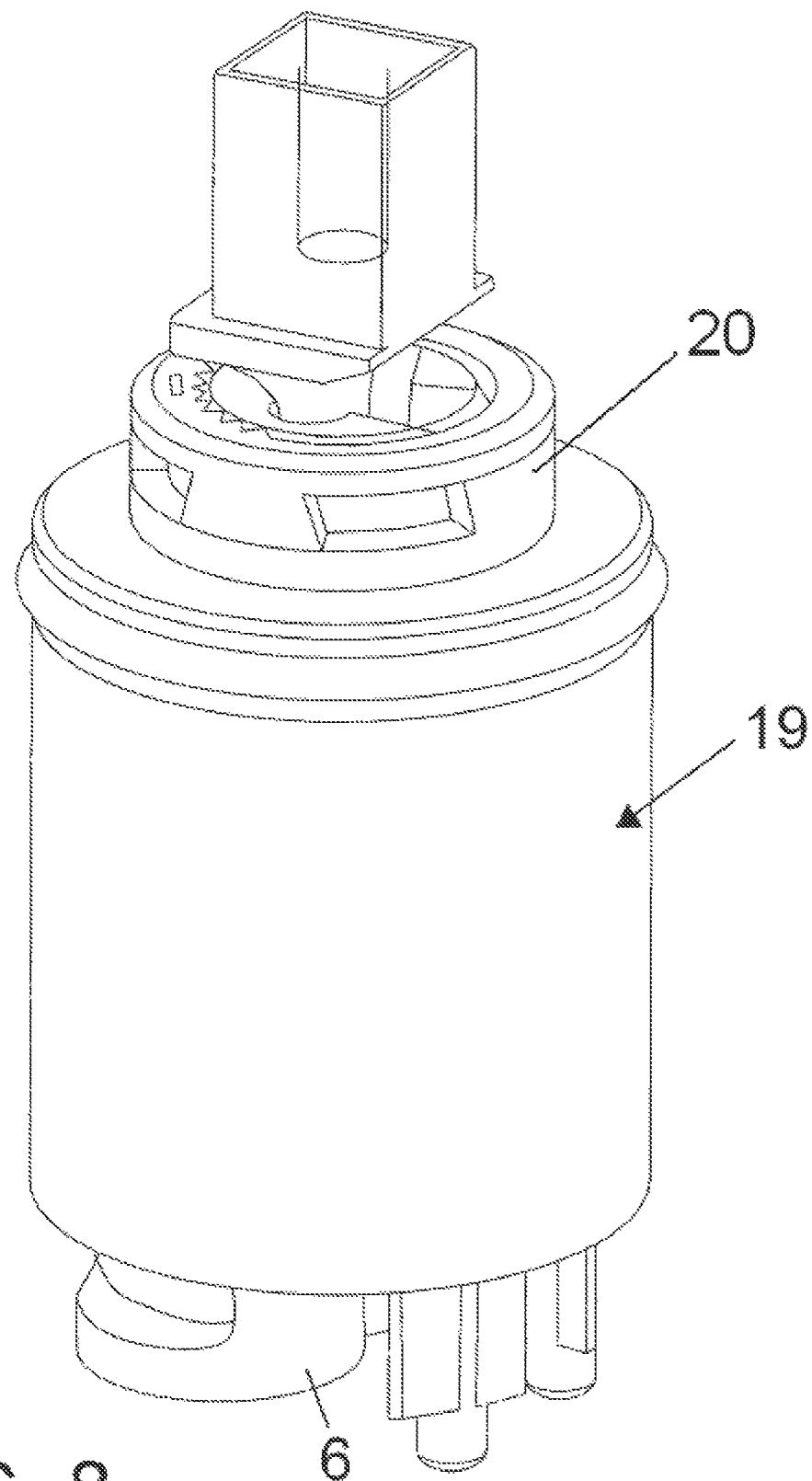
FIG. 8 is yet another perspective view showing an embodiment of the mixing cartridge with a mixing cartridge holding body in which water is circulated under a raised bottom.

In an embodiment of the inventive cartridge, wherein water is circulated under the raised bottom 6, and as shown in FIGS. 4 and 8, a diametral housing for an O-ring element is provided, thereby allowing a faucet tightness seat to have a diameter larger than that of the cartridge, contrarily to the prior art which provides an opposite construction.

Figure 9:
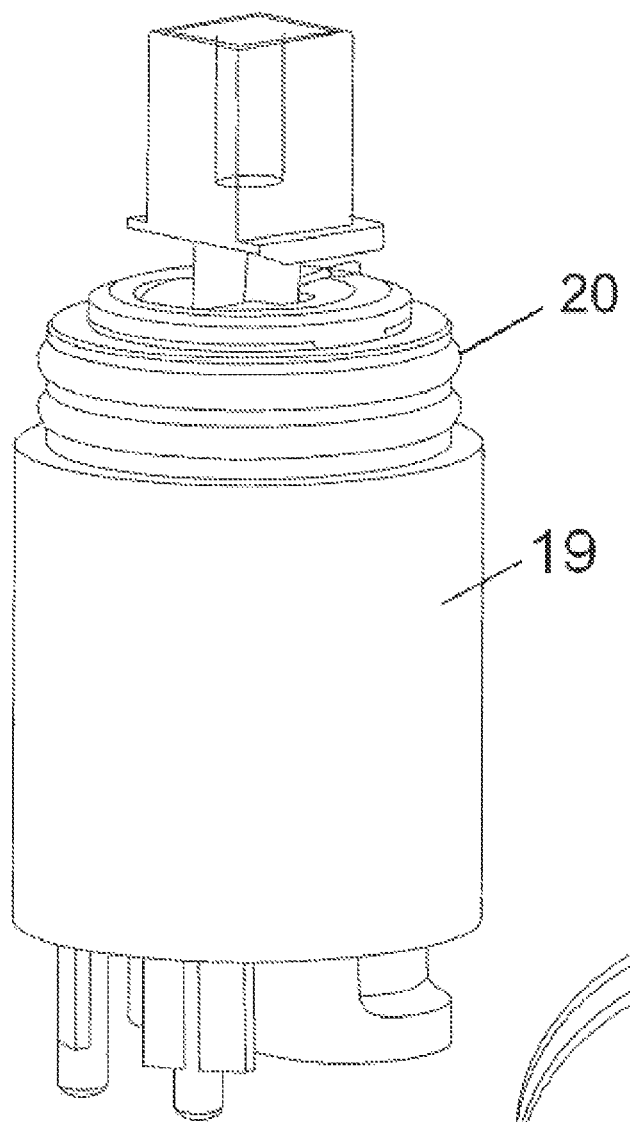
FIG. 9 is yet another perspective view showing a further embodiment of the inventive mixing cartridge with a holding body being sealed at a top collar thereof.
Figure 10:
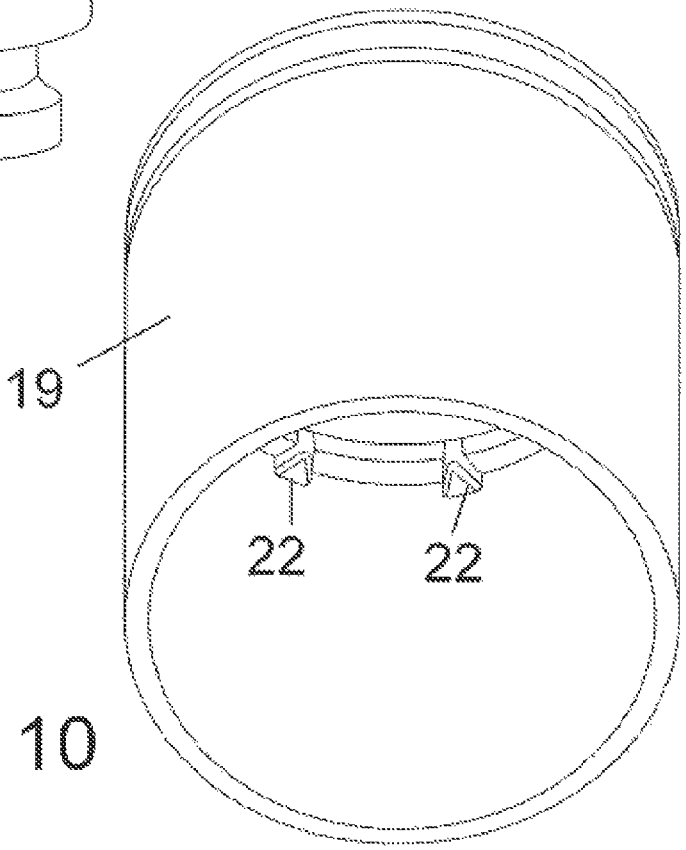
FIG. 10 is yet another perspective view showing an adapter for raising water of the cartridge embodiment shown in FIG. 8.

The above disclosed feature allows to assemble on this cartridge embodiment a water raising adapter, either with an outer sealing on its larger diameter 19, as shown in FIGS. 8 and 10, or a simple or double sealing on the top collar 20, as shown in FIG. 9, or any other suitable configurations as required.

The above approach allows to bring mixed water to a mixed water outlet arranged at a height as greater as possible, while preventing water from entering the cartridge mechanism, since it is insulated by the inner O-ring assembled as disclosed.

This solution, moreover, makes the inventive cartridge most suitable for meeting at present novel faucet designs.

In this connection it should be pointed out that, though on the market apparently analogous products are available, in these products the mixing cartridge, however, is engaged from the top side and not from the bottom side as taught by the present invention, thereby it is not possible to achieve the miniaturized size which may be achieved by the two disclosed embodiments of the present invention.

The greater diameter adapter 19 sealing is performed on the faucet body, not shown in the figures.

The sealing of the adapter 19 on the collar 20 is performed inside the cartridge clamping ring nut, said ring nut including an outer gasket providing a sealing coupling on the faucet body.

According to a further aspect of the present invention, the water raising adapters may comprise inner projections 22, as shown in FIG. 10, adapted to be engaged in corresponding cavities 21 formed on the holding body 1 top.

This feature, shown in FIG. 2, allows to provide a snug orienting and prevents any rotary movement with respect to the holding body.

It has been found that the invention fully achieves the intended aim and objects.

In fact, the invention has provided a "miniaturized" single control lever mixing cartridge, free of the above disclosed drawbacks of similar prior mixing cartridges.

The inventive mixing cartridge provides optimum performance with respect to its reliable operation, and a maximum freedom in selecting the faucet product thereinto said cartridge will be installed.

The most advantageous features of the present invention, which allow to achieve a very great increase of the hydraulic performance thereof, consist, at first, of the side windows of the holding body allowing a larger movement than that permitted by a closed holding body.

Another very important feature is the provision of rear blind latching elements for clamping the fixed plate providing an enhanced useful area.

Moreover, also the top movable plate profile with the two side projections or rear enlarged portions is a very important constructional feature.

Yet another very important aspect of the present invention is the possibility of providing the cartridge, in a long bottom embodiment thereof, with a socket element allowing water to achieve an enhanced height.

In fact, as the socket is introduced in the cartridge from above, it allows to further reduce the size while permitting water to achieve greater height, up to the collar, the starting cartridge size being the same.

In practicing the invention, the used materials, as well as the contingent size and shapes, can be any, depending on requirements.

The invention claimed is:

1. A high performance single control lever cold water and hot water mixing cartridge, said mixing cartridge comprising a holding body including at least a bottom fixed plate and at least a top movable plate, and a driving member for driving said top movable plate, characterized in that said holding body includes side windows allowing the top movable plate and driving member to exit said holding body, as said driving member is driven from an all hot water to an all cold water position of said driving member.

2. A mixing cartridge, according to claim 1, characterized in that said bottom fixed plate is coupled through two rear blind not throughgoing rear recesses to latching elements arranged on a fixed support.

3. A mixing cartridge, according to claim 1, characterized in that said bottom fixed plate comprises on a bottom side thereof a plurality of slots for engaging therein, in a partially recessed position, an inner sealing gasket.

4. A mixing cartridge, according to claim 1, characterized in that said movable plate comprises a port having a substantially triangular contour with convex sides, and including two side outlets or supplementary lugs.

5. A mixing cartridge, according to claim 1, characterized in that said holding body comprises, at a top portion thereof, two detent elements having a substantially reversed trapezoidal configuration and a contour mating a contour of corresponding detent elements provided on a temperature limiting ring nut member.

6. A mixing cartridge, according to claim 1, characterized in that said cartridge comprises a cartridge rod supported by a support element including a double abutment for simultaneously abutting thereon lug elements on rotary detent members provided in said holding body.

7. A mixing cartridge, according to claim 6, characterized in that said rod comprises a rotary pin for increasing a strength of said detent members.

8. A mixing cartridge, according to claim 1, characterized in that said cartridge comprises a projecting bottom portion thereunder water is circulated.

9. A mixing cartridge, according to claim 8, characterized in that said cartridge comprises a water raising adapter including an adapter top sealing collar.

10. A mixing cartridge, according to claim 9, characterized in that said adapter top sealing collar is adapted to be sealed in a cartridge clamping ring nut including an outer gasket.

11. A mixing cartridge, according to claim 9, characterized in that said water raising adapter comprises inner projections for engagement in corresponding cavities formed on a top portion of the cartridge holding body.

\* \* \* \* \*